United States Patent [19]
Wernli et al.

[11] Patent Number: 5,172,540
[45] Date of Patent: Dec. 22, 1992

[54] APPARATUS FOR CHANGING BOBBIN TUBES AND TUBE GRIPPER THEREFOR

[75] Inventors: Joerg Wernli; Daniel Brennwalder; Markus Erni, all of Winterthur; Isidor Fritschi, Andelfingen; Andreas Wanzenried, Wittenwil, all of Switzerland

[73] Assignee: Rieter Machine Works, Ltd., Winterthur, Switzerland

[21] Appl. No.: 642,660

[22] Filed: Jan. 17, 1991

Related U.S. Application Data

[62] Division of Ser. No. 485,946, Feb. 27, 1990, Pat. No. 5,014,505, which is a division of Ser. No. 233,564, Aug. 18, 1988, abandoned.

[30] Foreign Application Priority Data

Aug. 18, 1987 [CH] Switzerland .................. 3169/87

[51] Int. Cl.⁵ .................................. D01H 9/02
[52] U.S. Cl. .................................. 57/275; 285/319; 403/2; 403/329
[58] Field of Search .................. 57/274, 275; 403/2, 403/329; 285/317, 319

[56] References Cited

U.S. PATENT DOCUMENTS

| | | | |
|---|---|---|---|
| 367,578 | 8/1887 | Babb | 403/329 X |
| 2,765,581 | 10/1956 | Adler | 403/329 X |
| 3,633,959 | 1/1972 | McCollough | 57/275 X |
| 3,699,580 | 10/1972 | Joseph et al. | 403/329 X |
| 3,741,589 | 6/1973 | Herd et al. | 285/319 X |
| 3,808,788 | 5/1974 | Viglione | 57/275 |
| 3,895,482 | 7/1975 | Schulz et al. | 57/275 |
| 4,436,269 | 3/1984 | Dirksing et al. | 403/329 X |
| 4,758,024 | 7/1988 | Kaempen | 285/319 X |

FOREIGN PATENT DOCUMENTS 392279 10/1990 European Pat. Off. .......... 57/275

*Primary Examiner*—Joseph J. Hail, III
*Attorney, Agent, or Firm*—Francis C. Hand

[57] ABSTRACT

The grippers are mounted on a doffer bar so as to disengage from both the top and bottom of the bar should a mis-alignment occur relative to a bobbin tube. The removal or separation of a gripper from the bar causes a pneumatic or electrical signal to be generated which can be used to indicate the individual disturbance location. A light may also be provided at each gripper station in order to indicate a position of a disturbance.

6 Claims, 3 Drawing Sheets

APPARATUS FOR CHANGING BOBBIN TUBES AND TUBE GRIPPER THEREFOR

This is a division of application Ser. No. 07/485,946 filed Feb. 27, 1990 now U.S. Pat. No. 5,014,505, which is a division of U.S. Ser. No. 07/233,564, filed Aug. 18, 1988, now abandoned.

This invention relates to an apparatus for changing bobbin tubes. More particularly, this invention relates to an apparatus for changing bobbin tubes in a textile machine, such as a ring spinning machine. Still more particularly, this invention relates to a tube gripper for changing a bobbin tube in a textile machine.

Heretofore, various types of devices have been known for the changing of bobbin tubes on a textile machine such as a ring spinning machine. Generally, these devices have been utilized to perform an operation wherein a plurality of full tubes or cops are simultaneously or jointly lifted and moved away from the spindles of a ring spinning or ring twisting machine and then replaced by the same number of empty tubes. To this end, the devices have employed a doffer bar on which a plurality of tube grippers having air-filled bellows or the like are mounted for gripping the tubes. However, it is possible that a gripper cannot engage the intended tube, for example, because of an unintentional inclined position of the tube, or cannot lift the tube because the tube is clamped excessively on the spindle. This may result in damage to the textile machine in general and to the doffer bar, the gripper and the tube in particular. Even slight damage, for example a torn gripper bellows, may result in a relatively long downtime or repair time. A number of automatic doffer devices have already been proposed in order to obviate such damage. Nevertheless, these devices still require monitoring of the changing operation personally and to the immediate stopping the changing device in the event of the slightest disturbance.

DE-OS 1,939,835 describes a tube changing device wherein grippers are disposed on a bar underside and are limitedly pivotable and limitedly movable axially upwards and, given adequate movement, tension a tension wire connected to a switch, so that the changing device is stopped. However, one disadvantage of this device is that it is impossible to obviate a disturbing influence comprising a vertical downwardly directed force component. A case of this kind would occur if the gripper engages a full tube but cannot lift the tube because the tube is jammed on the spindle. The air-filled gripper bellows is torn and the cop damaged or else the bar itself is subjected to a downward deflection. It is also quite likely that the tension wire will lose tautness in the course of time so that a disproportionately long response time must inevitably result in jamming of machine parts. Even if the tension wire is taut, however, the switch in the construction shown cannot initiate stoppage of the changing device if the full tube is simply pivoted out of position. Even with immediate stoppage, it is not possible to obviate jamming firstly because the relative movement of the gripper with respect to the bar is limited and secondly because the relative movement takes place against the tensioning force of springs. Since the location of the disturbance is not indicated, an operative must first search for the disturbance and try, by manual force, to move the jammed parts apart, or else the changing device must be reversed. Only after the damage has been eliminated for a single gripper is it possible to restart the entire machine. Labor costs, machine downtimes and repair charges may be the result either individually or cumulatively. The apparatus can also be regarded as complicated and expensive.

DE-PS 2,231,377 shows an apparatus wherein, instead of a tension wire, stoppage is initiated by closing a circuit when two metal parts on the gripper and on the bar touch one another due to a relative pivoting movement. In the normal case, the metal parts are separated from one another by a gap. However, it can be assumed with certainty that a dusty and fluffy atmosphere about the apparatus will cause this gap to rapidly fill with such material so that this apparatus must fail in an emergency due to an uncontrolled reduction of conductivity. Also, if the stopping mechanism were to operate, all the possible disturbance locations would be displayed and this without the actual location of the disturbance.

The "Marzoli" leaflet "Spin doff-2" discloses a gripper secured laterally to a bar by means of two superimposed retaining elements, such gripper separating from the bar when impacting a tube. The top retaining element on the gripper is releasably hooked in the bar while the bottom retaining element in the form of a flexible lug o the gripper is engaged by catch or snap action in the corresponding retaining element on the bar. An upwardly directed force originating from a disturbing influence, e.g. a tube at an angle, causes the gripper to be set at a slight angle, so that the gripper pivots around the hooked-in retaining element and disengages the bottom retaining element from the bar. The disturbing force, which continues to be operative, then overcomes the resistance at the hooked-in top retaining element, so that separation of the gripper takes place. The great advantage in this case is that the doffing operation and hence the spinning operation can be continued without the separated gripper without any loss of time. The apparatus can, in general, be regarded as simple and inexpensive.

However, even an operative on the site may not directly notice a possibly downwardly directed force on the gripper and hence on the bar during lifting of the tubes so that deflection damage and the like can occur before the need for intervention becomes apparent. With this latter device, it is not possible to prevent damage in this respect. Furthermore, the gripper including the flexible lug is made cheaply from a plastic. As a result, the lug retaining force can soon deteriorate as soon as the connection between the gripper and the bar weakens. In addition, the gripper has an air duct or conduit for a bellows which is connected to an air feed duct in the bar while a hollow pin with an 0-ring on the periphery of a free end acts as a sealing means between the gripper and the bar and is screwed into the bar. However, it is expensive to make a screw thread in the bar and the pin also prevents the gripper from separating from the bar.

Accordingly, it is an object of the invention to provide a structurally simple and inexpensive apparatus for changing bobbin tubes.

It is another object of the invention to allow spinning to be maintained during a doffing operation in the event of disturbances in the doffing operation.

It is another object of the invention to provide for an automatic doffing of bobbin tubes in a textile machine without need for staff supervision.

It is another object of the invention to be able to perform a bobbin tube changing operation in a minimum of time.

It is another object of the invention to eliminate a risk of damage to a bobbin or gripper during bobbin changing operation.

It is another object of the invention to be able to reliably and quickly locate a disturbance in a bobbin tube changing operation.

Briefly, the invention provides an apparatus for changing bobbin tubes which is comprised of at least one doffer bar having top retaining elements and bottom retaining elements and a plurality of tube grippers which are disposed laterally of the bar for engaging with bobbin tubes. In addition, each gripper has a top retaining element and a bottom retaining element for releasably engaging a respective retaining element of the doffer bar. Further, a signal generating unit is provided which is responsive to separation of the retaining elements of a respective gripper from the retaining elements on the bar in order to generate a signal in response thereto.

Since the top retaining elements can be the first to be disengaged, a downwardly directed disturbing force on the gripper cannot cause any damage. There is no need for additional cost in redesigning the top retaining elements, while the simple construction can be retained. If the gripper cannot, for example, lift a full tube from the spindle, the gripper is pivoted to the side slightly, this being immediately rendered possible by deformation of an inflatable bellows of the gripper, until the griper first disengages at the top. The gripper then remains on the tube, and the bar can continue movement in the direction of the empty tubes. The empty replacement tube cannot be engaged due to the absence of the gripper. Consequently, there is no machine downtime.

Of course an event of this kind must not remain unnoticed. However, it is sufficient to generate a signal, e.g. in a monitoring room, in order to initiate any necessary action. It is essential that this signal should be generated reliably, and this condition is undoubtedly met by the complete separation, in contrast to grippers which simply spring back.

The retaining elements of a gripper may be elastically deformable upon separation from the doffer bar or may be in form of magnets. In either case, a structurally simple type of retaining element is provided. Further, where the retaining elements are in the form of magnets, the retaining elements practically do not interengage so that separation of a gripper from the bar is more satisfactorily guaranteed. Further, a separation of a gripper from the bar may also take place with a shearing-like action with the top and bottom retaining elements being disengaged simultaneously.

The apparatus may also be provided with a sensor duct in the doffer bar for receiving a fluid under pressure as well as a plurality of apertures in the bar in communication with the duct and with each aperture disposed in communication with a respective gripper. In addition, a means is provided in communication with the duct for generating a signal in response to a pressure drop in the duct in order to indicate a break in communication between an aperture and a respective gripper. This structure provides a clear signal because, on complete separation, there is no gripper to spring back to disturb the outflow of fluid, such as compressed air, and, accordingly to suppress the triggering of a signal. If there is a temporary removal of a gripper from the doffer bar, for example, if the gripper is pivotable relative t the bar but is not capable of separation therefrom, the above signal may be obtained but is less clear.

In another embodiment, the apparatus is provided with an electrical conductor path having spaced apart breaks on the doffer bar as well as bridging means on each gripper for bridging over a respective brake in the conductor path. In addition, a means is connected with the conductor path for responding to a current change therein in response to removal of a gripper from the bar. This embodiment generates a signal which is certain (although less certain in the case of a temporary removal) and which opens further prospects, by using an electrical current with dust-protected breaks.

A plurality of resistors may also, be connected to the conductor path with each resistor disposed adjacent a respective one of the breaks whereby the means measures the current change in response to removal of a gripper in order to determine the position of the removed gripper. This allows the individual location of a disturbance to be displayed.

In order to completely eliminate the risk of dust which may impair the breaks and contacts, a reed relay is used to define each break and each bridging means is in the form of a magnet which maintains a respective relay in a conducting state. A lamp may also be connected in parallel with each relay for lighting in response to the relay being changed to a non-conductive state.

The apparatus may also have a signal line extending from each break in at least one section of the doffer bar in order to convey a signal in response to removal of a gripper from a respective break. In addition, the signal line may be connected to a microprocessor which receives the signals as well as a main control computer connected to the microprocessor and being programmable for a data capture of the removed grippers in order to transmit a break signal to the doffer bar. A spindle drive for each gripper may also be connected with the computer in order to receive the break signal. With this construction, one electrical signal permits all of the possible display and control functions to be performed.

The tube gripper may be constructed with at least one flexible plastic retaining lug and a metal spring for adjusting the tautness of the lug. In addition, a cylindrical cavity may be formed in a wall of the tube gripper while a sealing means is positioned in the cavity for sealing an aperture in the doffer bar. This sealing means may include a cylindrical elastic element in the aperture and a support pin in the elastic element. Such a sealing means is relatively simple, inexpensive and reliable. As a result, machining of the doffer bar can be largely eliminated and separation can be effected more simply. In comparison with a conventional 0-ring, the sealing means is reliably retained in the gripper wall but may, however, be readily replaced.

These and other objects and advantages of the invention will become more apparent from the detailed description taken in conjunction with the accompanying drawings wherein.

Figure 1:
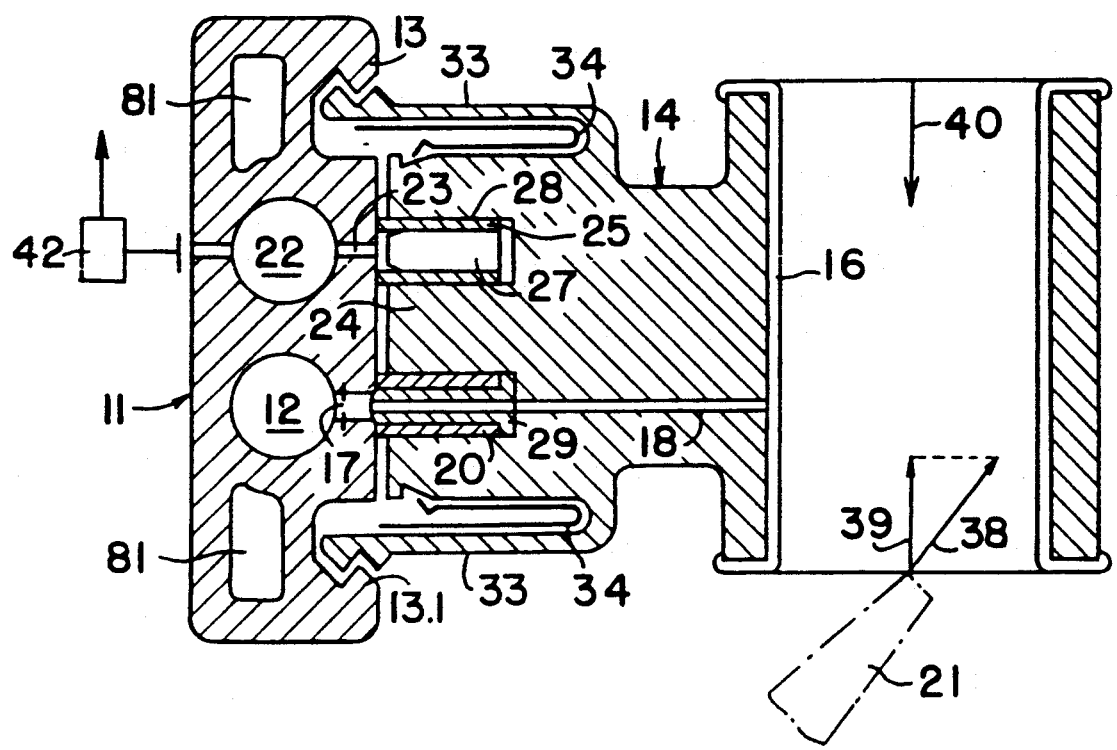
FIG. 1 illustrates a vertical cross-sectional view of an apparatus constructed in accordance with the invention.

Referring to FIG. 1, the apparatus for changing bobbin tubes on a textile machine includes a doffer bar in the form of an aluminum extruded section having a longitudinal feed duct 12 and top and bottom retaining elements 13, 13.1 in the form of facing projections. In addition, the apparatus includes a plurality of tube grippers 14 which are individually disposed laterally of the bar 11 for engaging respective bobbin tubes 21.

Each gripper 14 is in the form of a plastic body having an aperture for receiving a bobbin tube 21 and a cylindrical bellows or diaphragm 16 about the aperture. As indicated, a conduct 18 extends through the body to communicate with the feed duct 12 in the bar 11 via an aperture 17 in the bar 11. A fluid, such as compressed air, is feed to and discharged from the duct 12 through the aperture 17 and into the conduit 18 in order cause the inside diameter of the bellows 16 to vary so that a tube 21 which is packed with yarn or full or empty can be simultaneously jointly moved or changed. As indicated in FIG. 1, each aperture 17 is provided with a restrictor.

A sealing means is also mounted in a cylindrical cavity of a gripper 14 in order to seal about an aperture 17 in the doffer bar 11. As illustrated, the sealing means is formed by a cylindrical elastic sleeve 20 which projects from the wall and a support pin 29 which is disposed in the sleeve 20 in order to secure the sleeve in the cavity of the gripper 14. As indicated, the pin 29 is a hollow longitudinally drilled pin in order to communicate the conduit 18 in the gripper 14 with the apertures 17 in the doffer bar 11. In addition, the pin 29 has a rounded end for abutting against the doffer bar 11 at the aperture 17.

The doffer bar 11 also contains a second longitudinally extending compressed air sensor duct 22 with exit apertures 23 facing the gripper 14. In addition, a sealing means is mounted in a second cavity of the gripper 14 in order to seal the exit aperture 23. As indicated, the sealing means includes a cylindrical elastic sealing element such as a rubber ring 25 in the cavity disposed within the wall 24 of the gripper 14 and a support pin 27 which is recessed within the cylindrical cavity 28.

Figure 6:
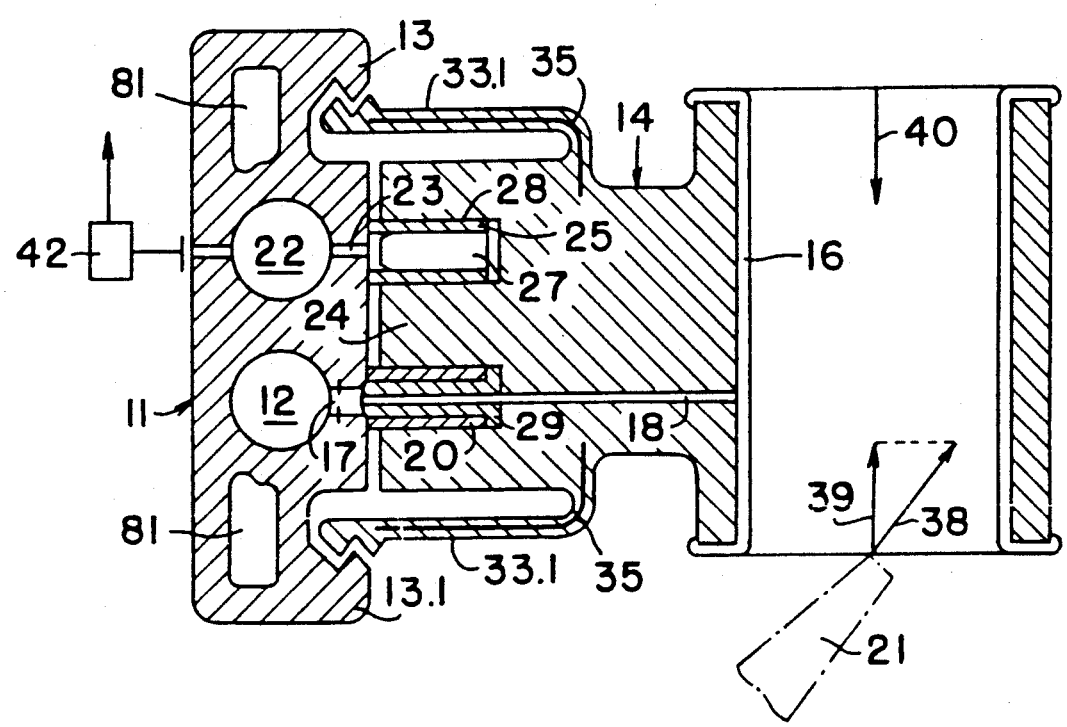
FIG. 6 illustrates a partial cross-sectional view similar to FIG. 1 of a modified spring arrangement in accordance with the invention.

The tube gripper 14 is provided with a pair of retaining elements on opposite sides of the sealing means for releasably engaging the doffer bar 11. As indicated, these retaining elements are in the form of integrally molded flexible elastic deformable lugs 33, 33.1 which are shaped so as to detachably connect with the parallel projections 13, 13.1 of the doffer bar 11. The retaining or clamping effect of the top retaining lug 33 is increased or supported by an interchangeable steel spring 34 which is disposed in snapfitted engagement between the lug 33 and the body of the gripper 14. The spring 34 is such that the tautness of the retaining lug 33 can be set to the required value. Alternatively as shown in FIG. 6, wherein like reference characters indicate like parts as above, a steel spring 35 may be embedded within a retaining lug lug 33.1.

When the full tubes 21 of a textile machine are ready for removal or changing during operation, a doffer bar 11 with a plurality of individually spaced apart tube grippers 14 is brought into position. At this time, the sensor duct 22 of the bar 11 must be filled with compressed air as there is no additional feed to the ducts 22 unlike the feed duct 12. The grippers 14 are then lowered over the tubes 21 by movement of the doffer bar 11 so that the bellows 16 upon being inflated by the supply of compressed air from the feed duct 12 engage the outer surfaces of the tubes 21.

If a tube 21 should be at an angle so as to be unengageable by a bellows 16, the tube would abut the bottom of the gripper 14 and would subject the gripper 14 to a disturbing influence in the form of a force 38 directly upwardly at an angle as indicated in FIG. 1. A vertical component 39 of this force 38 would cause the gripper 14 to perform a relative pivoting movement with respect to the bar 11 about the top projection 13 which forms a substantially horizontal turn-and-tilt axis with the bottom lug 33.1 first disengaging from the bottom projection 13.1. As a result of the disengagement in the bottom zone of the bar 11 and the continuing disturbance force 38, the top lug 33 would then also be completely and permanently disengaged or separated from the bar 11. As a result, there would be an outflow of air from both apertures 17, 23. With the passage aperture 17 constructed as a throttle, the air loss is small and does not act on the associated bellows 16. Good results, that is, below one percent pressure drop in the feed duct 12 with an aperture 17 open, have been obtained with a pressure of one to two bars in the feed duct 12 with a diameter of about 16 millimeters and with a diameter of 1 to 3 millimeters for the passage apertures 17.

The larger aperture 23 causes a sudden pressure drop of the air in the sensor duct 22. In a preferred embodiment with a sensor duct 22 having a diameter of 16 millimeters and a length of 40 meters and with a diameter value of 4 to 7 millimeters, a pressure drop of from 4 to 2 bars was obtained within about 1.3 to 0.4 seconds.

Referring to FIG. 1, a signal generating unit in the form of a warning and/or control unit 42 is connected to the sensor duct 42 in order to respond to a pressure drop. This unit is responsive to a separation of a gripper 14 in order to generate a signal, for example, for emission to a supervisor at a control desk to indicate that there has been a disturbance at one of the spindle stations of a particular doffer bar 11. The changing apparatus of the associated bar can then be stopped, although this is not essential.

If a gripper 14 is subject to a disturbing influence having a vertical downwardly directed force component 40 (see FIG. 1), the bottom projection 13.1 acts as a turn-and-tilt pivot. In this case, the lug 33 would first disengage from the projection 13.

In the embodiment illustrated in FIG. 1, a single wide lug 33 is provided. However, a plurality of shorter lugs 33 can be provided. The same applies to the lower lug 33.1. Such short lugs can therefor disengage independently of one another and are not restricted to a specific sequence.

Of note, a gripper 14 may be reengaged or a separation cancelled manually. Further, as a result of the permanent separation of a gripper 14 from the bar 11, air continues to flow out of the aperture 23 for some time, thus ensuring the triggering of an acoustic, optical or other signal by the unit 42 responding to the air pressure drop. Although spinning may be continued, in the event of a disturbance caused by the force component 40, the gripper must be removed from the full tube before the spindles are rotated.

Figure 2:
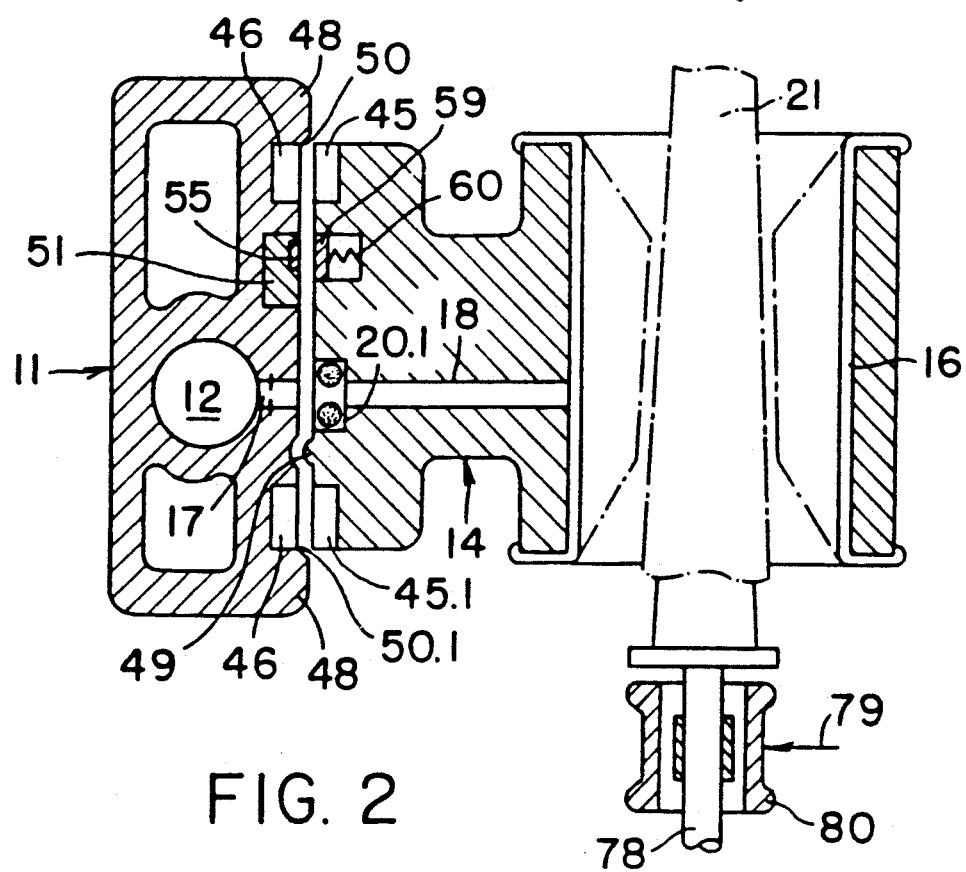
FIG. 2 illustrates a vertical cross-sectional view of a modified apparatus in accordance with the invention.

Referring to FIG. 2, wherein like reference characters indicate like parts as above, the retaining elements for the gripper 14 may be in the form of permanent magnets 45, 45.1 while the retaining elements for the bar 11 are small iron plates or rails 46 which may be interchanged from time-to-time. The magnets 45, 45.1 may be in the form of a strip extending over the length of the gripper 14 or may be divided into separate magnets placed at the corners. Accurate placement on the bar 11 can be facilitated, for example by means of rounded projections 48 on the bar 11 or by means of one or more rounded projections 49 on the gripper body. Turn-and-tilt pivots 50, 50.1 form where the magnets 45, 45.1 touch the projections 48. Given appropriate dimensioning of the project ions 48, 49, separation of the gripper 14 from the bar 11 is ensured to take place by means of the gripper 14 sliding with a shearing-like motion with the top and bottom retaining elements.

As indicated in FIG. 2, a conventional 0-ring 20.1 is disposed in a recess of the gripper 14 to provide a seal between the feed duct 12 and the conduit 18. Alternatively, a seal means as illustrated in FIG. 1 may also be used. In this latter case, the projecting free end of the pin 29 would render the need for the convex projection 49 superfluous.

Figure 3:
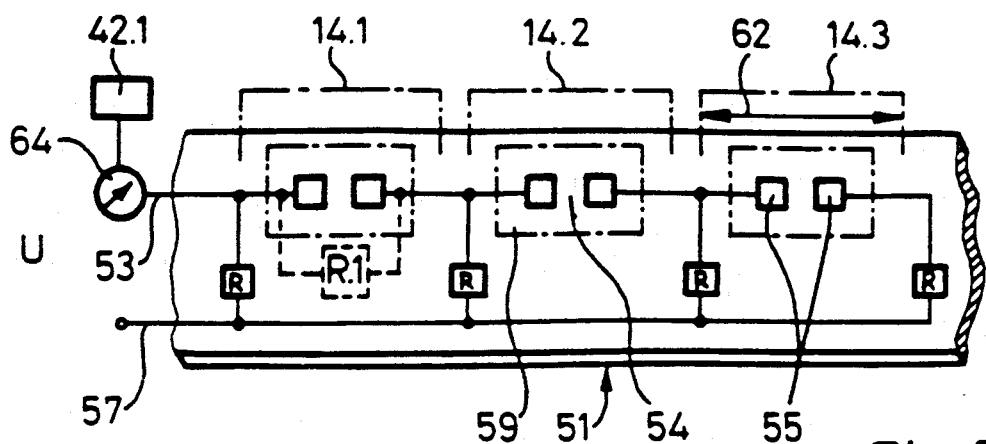
FIG. 3 illustrates a plan view of a doffer bar employing an electrical conductor path in accordance with the invention.

As indicated in FIG. 2, a printed circuit board 51 is provided in place of a compressed air sensor duct 22 (see FIG. 1) in the bar 11. As indicated in FIG. 3, an electrical conductor path made from surface-coated copper, is provided on the circuit board 51 to form a current supply path 53 with a plurality of breaks 54 each of which is defined by two current contact surfaces 55 having anti-corrosion coatings. In addition, identical resistors R are provided between a current discharge line 57 and the supply line 53 near each gripper 14 in which a low-tension D.C. of, for example, 24 volts is maintained. Each pair of contact surfaces 55 is bridged by a bridging means, for example in the form of a small conductive plate 59 which is located on each gripper 14 and is pressed into contact with the surfaces 55 by means of a spring 60 (see FIG. 2). Each plate 59 is situated within a common overlap zone 62 of the gripper 54 and the bar 11. If, for example, there are three plates 59 in the circuit illustrated, an ammeter 64 is used to measure a current in accordance with the formula:

Voltage $U = \frac{1}{3} \times$ resistor $R \times$ current $I$.

If plate 59 of gripper 14.1 is removed, the formula becomes:

$U = R \times I$.

If plate 59 of gripper 14.2 is removed the formula becomes:

$U = \frac{1}{2} \times R \times I$.

If plate 59 of gripper 14.3 is removed, the formula becomes:

$U = \frac{1}{3} \times R \times I$.

The value of the measured current is an indication of the specific disturbance location and is fed to a means such as an evaluator 42.1 which measure current variations and generates signals. The signals can be used in a number of ways If just one signal is sufficient for a general, i.e. non-specific, disturbance location, the resistors R can be omitted.

In this embodiment, modifications are possible. For example, the plate 59 may be replaced by a contact spring. The circuit can also be so designed that the breaks 54 are bridged by resistors R.1. The plate 59 can also protect the contact section from dust by means of a seal.

Figure 4:
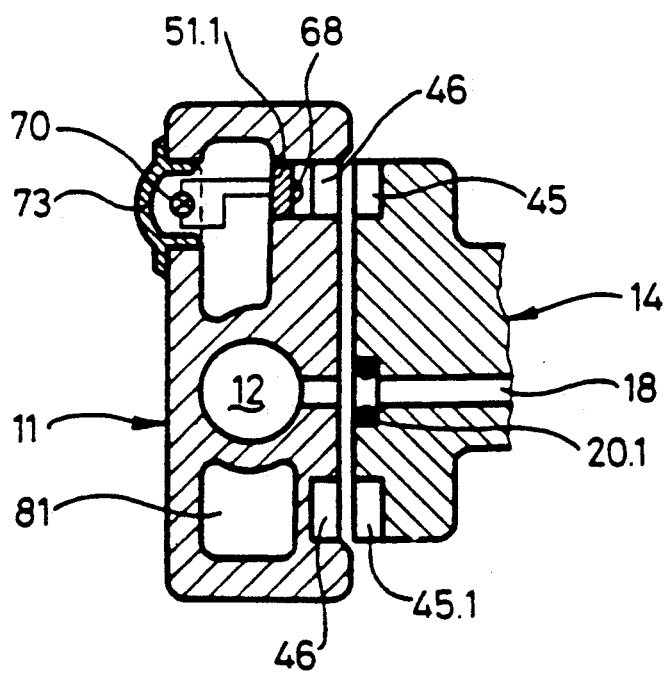
FIG. 4 illustrates a part cross-sectional view of an embodiment employing a lamp for lighting in response to a disturbance in accordance with the invention.
Figure 5:
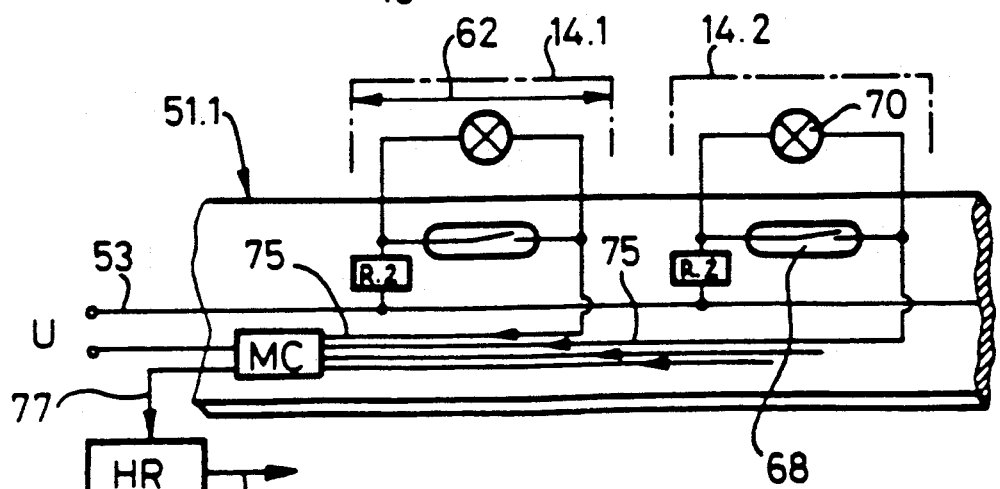
FIG. 5 illustrates a schematic of an embodiment employing relays and lamps for detecting disturbances in accordance with the invention.

Referring to FIGS. 4 and 5, wherein like reference characters indicate like parts as above, a circuit board 51.1 may be provided with reed relays 68 in order to form a bridging means or contact means which are kept in a conductive position by top magnets 45 on a gripper 14. If the gripper 14 is removed, the relay 68 is placed in a non-conductive state. The top magnet 45 may also serve as a retaining element while the bottom magnet 45.1 may be replaced by a lug 33.1.

As indicated, a light source or incandescent lamp 70, such as a light emitting diode, may be disposed in a recess 73 on the bar 11 in parallel with a relay 68 so that when the relay 68 is deactivated, the lamp 70 lights in order to locally indicate a fault. As indicated in FIG. 5, a resistor R.2 completes the circuit.

As further shown in FIG. 5, an individual signal line 75 extends from each gripper 14.1, 14.2 or at least one section for a number of grippers and leads to an evaluator circuit or a microprocessor MC which, in turn, is connected to a main control computer HR via a serial data transmission line 77. The main control computer HR is programmed for data capture of the gripers 14 so that the frequency of disturbance of the individual spindle locations can be determined.

Further, one or more bars 11 of the textile machine can be stopped in response to a fault being detected. For example, if a spindle 78 (see FIG. 2) is equipped with an individual drive, the main control computer HR can feed a stop signal via a signal transmission line 79 to an associated stator winding 80 at the spindle 78 so that the changing operation can be continued without interruption simple with the omission of the spindle location where there is a fork.

It will be apparent that a number of combinations of embodiments are possible. For example, to name just a few, the embodiment according to FIG. 1 may be equipped with magnetic retaining elements. The compressed air sensor duct 22 is independent on whether a pneumatic diaphragm 16 or a mechanical gripper means is used for the tubes 21. The cavities 81 in the bar section may be of any desired shape.

The retaining elements 13, 13.1 may also be designed to project away from the bar 11 and be of cupola shape. The electrical contacts may be so designed that, for example, a cam acting as a non-conductive bridging means keeps the contact open, in which case the contact then closes when the gripper 14 is separated from the bar 11. Thus, referring to FIG. 3, a break 54 with a resistor R may be disposed between the lines 53, 57; in the event of separation taking place the electrical contact closes so that the current is increased. Instead of using the voltage source with current measurement, it is possible to use a current source with voltage measurement for signal evaluation purposes.

What is claimed is:

1. A tube gripper for a textile machine comprising
    a plastic body having an aperture in one side for receiving a bobbin tube therein;

a pair of retaining lugs extending from said body from a respective top and bottom of said body and on an opposite side from said aperture and perpendicularly of an axis of said aperture for releasably engaging with a doffer bar, at least one of said lugs being flexible; and a metal spring associated with said flexible lug and said body for adjusting the flexibility of said lug and biasing said flexible lug outwardly of said body to releasably engage the doffer bar.

2. A tube gripper as set forth in claim 1 wherein said metal spring is embedded within said retaining lug.

3. A tube gripper as set forth in claim 1 wherein said spring is disposed in snap-fitted engagement between said lug and said body.

4. A tube gripper as set forth in claim 1 wherein said lug extends integrally from said body.

5. A tube gripper as set forth in claim 1 wherein said lug has a part for engaging with a doffer bar and said metal spring is disposed between said body and said part of said lug.

6. A tube gripper as set forth in claim 1 wherein each of said lugs is flexible.

* * * * *